US012142853B2

(12) United States Patent
Jian et al.

(10) Patent No.: US 12,142,853 B2
(45) Date of Patent: Nov. 12, 2024

(54) ANTENNA UNIT AND TERMINAL DEVICE

(71) Applicant: VIVO MOBILE COMMUNICATION CO., LTD., Guangdong (CN)

(72) Inventors: Xianjing Jian, Guangdong (CN); Huan-Chu Huang, Guangdong (CN); Yijin Wang, Guangdong (CN); Rongjie Ma, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 385 days.

(21) Appl. No.: 17/530,847

(22) Filed: Nov. 19, 2021

(65) Prior Publication Data

US 2022/0077583 A1 Mar. 10, 2022

Related U.S. Application Data

(63) Continuation of application No. PCT/CN2020/090100, filed on May 13, 2020.

(30) Foreign Application Priority Data

May 22, 2019 (CN) ........................ 201910430958.7

(51) Int. Cl.
*H01Q 9/04* (2006.01)

(52) U.S. Cl.
CPC ............... *H01Q 9/045* (2013.01); *H01Q 9/04* (2013.01)

(58) Field of Classification Search
CPC ........ H01Q 9/045; H01Q 21/08; H01Q 1/243; H01Q 9/0457; H01Q 19/10; H01Q 1/36;
(Continued)

(56) References Cited

U.S. PATENT DOCUMENTS 4,764,771 A * 8/1988 Sterns .................... H01Q 21/08 333/116
5,210,542 A * 5/1993 Pett ...................... H01Q 9/0457 343/757

(Continued)

FOREIGN PATENT DOCUMENTS

CN 1454027 A 11/2003
CN 101740870 A 6/2010

(Continued)

OTHER PUBLICATIONS

Sruthi et al., "Design of a Dual-Polarized Antenna Using Square Backed Cavity", M. Tech, School of Electronics Engineering, VIT University, Vallore.

(Continued)

*Primary Examiner* — Hai V Tran
(74) *Attorney, Agent, or Firm* — Price Heneveld LLP

(57) ABSTRACT

Embodiments of the present disclosure provide an antenna unit and a terminal device. The antenna unit includes an insulating groove, M feeding parts disposed in the insulating groove, M couplers, a first insulator, at least two radiators carried on the first insulator, a first radiator disposed at a bottom of the insulating groove, and an isolator disposed around the M couplers, where the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer.

20 Claims, 11 Drawing Sheets

(58) Field of Classification Search
CPC .......... H01Q 1/50; H01Q 1/521; H01Q 5/307; H01Q 5/50; H01Q 9/04
See application file for complete search history.

(56) References Cited

U.S. PATENT DOCUMENTS

| | | | | | |
|---|---|---|---|---|---|
| 5,300,936 | A * | 4/1994 | Izadian | H01Q 1/32 | 343/741 |
| 5,717,405 | A * | 2/1998 | Quan | H01Q 3/22 | 342/149 |
| 6,091,373 | A * | 7/2000 | Raguenet | H01Q 9/0435 | 343/778 |
| 6,674,410 | B1 * | 1/2004 | Davidovitz | H01P 5/16 | 342/373 |
| 6,770,955 | B1 * | 8/2004 | Coccioli | H01L 23/3128 | 257/784 |
| 6,859,186 | B2 * | 2/2005 | Lizalek | H01Q 13/10 | 343/789 |
| 6,876,328 | B2 * | 4/2005 | Adachi | H01Q 9/0428 | 343/846 |
| 6,891,508 | B2 * | 5/2005 | Inoue | H01Q 1/38 | 343/726 |
| 8,912,970 | B1 * | 12/2014 | Manry, Jr. | H01Q 1/52 | 343/700 MS |
| 9,379,453 | B2 * | 6/2016 | Rentz | H01Q 1/36 | |
| 9,837,700 | B2 * | 12/2017 | Yagi | H01Q 1/2216 | |
| 2004/0004571 | A1 | 1/2004 | Adachi et al. | | |
| 2004/0051675 | A1 * | 3/2004 | Inoue | H01Q 5/40 | 343/728 |
| 2004/0056803 | A1 * | 3/2004 | Soutiaguine | H01Q 5/40 | 343/846 |
| 2004/0150575 | A1 | 8/2004 | Lizalek et al. | | |
| 2007/0052587 | A1 | 3/2007 | Cheng | | |
| 2007/0262828 | A1 * | 11/2007 | Fujita | H01P 5/107 | 333/248 |
| 2008/0238793 | A1 * | 10/2008 | Channabasappa | H01Q 9/0457 | 343/767 |
| 2008/0272963 | A1 * | 11/2008 | Chang | H01Q 9/0485 | 343/700 MS |
| 2010/0001906 | A1 * | 1/2010 | Akkermans | H01Q 9/0457 | 343/770 |
| 2010/0134362 | A1 * | 6/2010 | Takasu | H01Q 9/0407 | 343/893 |
| 2011/0134008 | A1 * | 6/2011 | Schadler | H01Q 21/08 | 343/843 |
| 2011/0181482 | A1 * | 7/2011 | Adams | H01Q 25/001 | 343/771 |
| 2012/0002388 | A1 * | 1/2012 | Utagawa | H01Q 5/25 | 361/782 |
| 2012/0098706 | A1 * | 4/2012 | Lin | H01Q 9/045 | 343/700 MS |
| 2015/0194724 | A1 * | 7/2015 | Yepes | H01Q 9/0407 | 343/702 |
| 2016/0197406 | A1 * | 7/2016 | Hashimoto | H01Q 21/24 | 343/848 |
| 2016/0336646 | A1 * | 11/2016 | Baek | H01Q 1/243 | |
| 2017/0033445 | A1 * | 2/2017 | Okajima | H04B 1/3818 | |
| 2017/0125919 | A1 * | 5/2017 | Chien | H01Q 9/0414 | |
| 2018/0013209 | A1 * | 1/2018 | Hung | H01Q 21/28 | |
| 2018/0219272 | A1 * | 8/2018 | Baheti | H01Q 9/0407 | |
| 2018/0261910 | A1 * | 9/2018 | Puente | H01Q 21/08 | |
| 2018/0269557 | A1 * | 9/2018 | Fangfang | H01P 3/121 | |
| 2019/0067823 | A1 * | 2/2019 | Irion, II | H01Q 13/085 | |
| 2019/0096829 | A1 * | 3/2019 | Tang | H01L 21/486 | |
| 2019/0115643 | A1 * | 4/2019 | Khan | H01Q 9/42 | |
| 2019/0115645 | A1 * | 4/2019 | Chang | H01Q 3/38 | |
| 2019/0207305 | A1 * | 7/2019 | Hashimoto | H01Q 9/0457 | |
| 2019/0221937 | A1 * | 7/2019 | Onaka | H01Q 5/385 | |
| 2020/0287287 | A1 * | 9/2020 | Ying | H01Q 9/0407 | |
| 2020/0373646 | A1 * | 11/2020 | Murata | H01Q 21/08 | |

FOREIGN PATENT DOCUMENTS

| | | | |
|---|---|---|---|
| CN | 102780075 | A | 11/2012 |
| CN | 203983480 | U | 12/2014 |
| CN | 206250377 | U | 6/2017 |
| CN | 110212300 | A | 9/2019 |
| JP | 4891698 | B2 | 3/2012 |
| WO | 2018074377 | A1 | 4/2018 |
| WO | 2019076928 | A1 | 4/2019 |

OTHER PUBLICATIONS

Yong-Xin et al., “60-GHz LTCC Antenna Arrays”, Department of Electrical and Computer Engineering, National University of Singapore, Republic of Singapore.

* cited by examiner

ANTENNA UNIT AND TERMINAL DEVICE

CROSS-REFERENCE TO RELATED APPLICATIONS

This application is a continuation application of International Application No. PCT/CN2020/090100 filed on May 13, 2020, which claims priority to Chinese Patent Application No. 201910430958.7, filed in China with the China National Intellectual Property Administration on May 22, 2019 and entitled "ANTENNA UNIT AND TERMINAL DEVICE", which are incorporated herein by reference in their entireties.

TECHNICAL FIELD

Embodiments of the present disclosure relate to the field of communications technologies, and in particular, to an antenna unit and a terminal device.

BACKGROUND

With the development of the fifth generation mobile communications (5-generation, 5G) system and widespread application of terminal devices, millimeter-wave antennas are gradually applied to various terminal devices, to meet increasing use requirements of users.

Currently, a millimeter-wave antenna in a terminal device is mainly implemented by using an antenna in package (AIP) technology. For example, as shown in FIG. 1, an array antenna 11 whose operating wavelength is a millimeter wave, a radio frequency integrated circuit (RFIC) 12, a power management integrated circuit (PMIC) 13, and a connector 14 may be encapsulated into a module 10 by using the AIP technology. The module 10 may be referred to as a millimeter-wave antenna module. An antenna in the foregoing array antenna may be a patch antenna, a Yagi-Uda antenna, a dipole antenna, or the like.

However, the antenna in the foregoing array antenna is generally a narrowband antenna (for example, the foregoing listed patch antenna), and therefore a coverage frequency band of each antenna is limited. However, a relatively large quantity of millimeter-wave frequency bands are generally planned in a 5G system, for example, an n257 (26.5 GHz-29.5 GHz) frequency band dominated by 28 GHz and an n260 (37.0 GHz-40.0 GHz) frequency band dominated by 39 GHz. Therefore, a conventional millimeter-wave antenna module may not completely cover a mainstream millimeter-wave frequency band planned in the 5G system, thereby causing poor antenna performance of the terminal device.

SUMMARY

Embodiments of the present disclosure provide an antenna unit and a terminal device, to resolve a problem that a millimeter-wave antenna of an existing terminal device covers less frequency bands, thereby causing poor antenna performance of the terminal device.

To resolve the foregoing technical problem, the embodiments of the present invention are implemented as follows:

According to a first aspect, the embodiments of the present disclosure provide an antenna unit. The antenna unit includes an insulating groove, M feeding parts disposed in the insulating groove, M couplers, a first insulator, at least two radiators carried on the first insulator, a first radiator disposed at a bottom of the insulating groove, and an isolator disposed around the M couplers, where the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer.

According to a second aspect, the embodiments of the present disclosure provide a terminal device, and the terminal device includes the antenna unit in the first aspect.

In the embodiments of the present invention, an antenna unit may include an insulating groove, M feeding parts disposed in the insulating groove, M couplers, a first insulator, at least two radiators carried on the first insulator, a first radiator disposed at a bottom of the insulating groove, and an isolator disposed around the M couplers, where the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer. According to this solution, on one hand, because the coupler is coupled to the at least two radiators and the first radiator, in a case that the coupler receives an alternating current signal, the coupler may be coupled to the at least two radiators and the first radiator, so that the at least two radiators and the first radiator can generate an induced alternating current signal, and the at least two radiators and the first radiator can generate electromagnetic waves of a specific frequency. In addition, because resonance frequencies of different radiators are different, frequencies of electromagnetic waves generated by the at least two radiators and the first radiator are also different, so that the antenna unit can cover different frequency bands, that is, frequency bands covered by the antenna unit can be increased. On the other hand, the isolator is disposed around the M couplers in the antenna unit. Therefore, the isolator may isolate electromagnetic waves radiated by the at least two radiators and the first radiator in a direction of the isolator, so that a maximum radiation direction of the electromagnetic waves generated by the at least two radiators and the first radiator faces an opening direction of the insulating groove. Thus, radiation intensity of the antenna unit in a radiation direction of the antenna unit can be improved while directionality of the antenna unit is ensured. In this way, frequency bands covered by the antenna unit can be increased, and radiation intensity of the antenna unit in the radiation direction of the antenna unit can be improved. Therefore, performance of the antenna unit can be improved.

Figure 1:
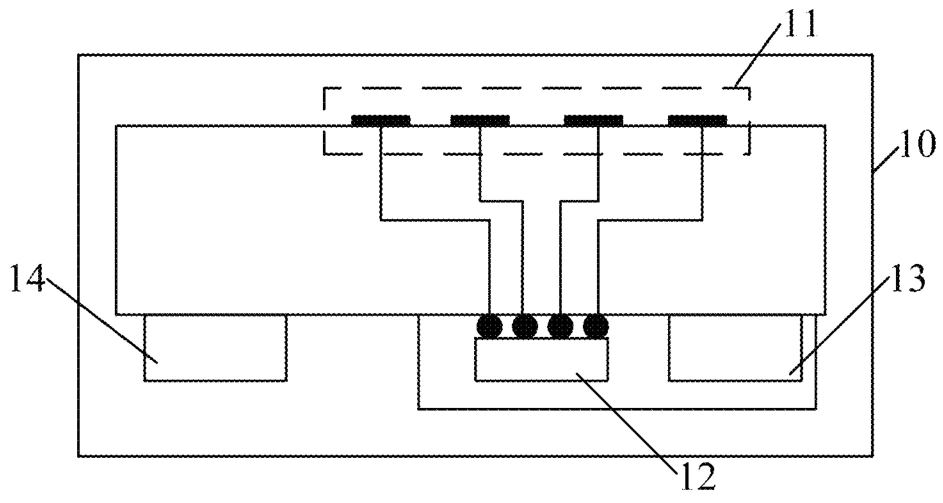
FIG. 1 is a schematic structural diagram of a conventional millimeter-wave antenna according to an embodiment of the present disclosure.

Reference numerals: 10. Millimeter-wave antenna module; 11. Array antenna whose operating wavelength is a millimeter wave; 12. RFIC; 13. PMIC; 14. Connector; 20. Antenna unit; 201. Insulating groove; 202. Feeding part; 2020. First end of the feeding part; 2021. Second end of the feeding part; 203. Coupler; 204. First insulator; 205. At least two radiators; 2050. Second radiator; 2051. Third radiator; 206. First radiator; 207. Isolator; 2070. First metal post; 2071. Second metal post; 208. Second insulator; 209. Third metal post; L1. First symmetry axis; L2. Second symmetry axis; 4. Terminal device; 40. Housing; 41. First bezel; 42. Second bezel; 43. Third bezel; 44. Fourth bezel; 45. Floor; 46. First antenna; 47. First groove.

It should be noted that, in the embodiments of the present disclosure, coordinate axes in a coordinate system shown in the accompanying drawings are orthogonal to each other.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "I" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first metal post, a second metal post, and the like are intended to distinguish between different metal posts, instead of describing a particular order of the metal posts.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

In the descriptions of the embodiments of the present disclosure, unless otherwise stated, "a plurality of" means two or more, for example, a plurality of antennas means two or more antennas.

The following describes some terms/nouns in the embodiments of the present disclosure.

Coupling means that two or more circuit elements, or input and output of an electronic network closely cooperate with each other and affect each other, and energy may be transmitted from one side to the other side through interreaction.

An alternating current signal is a signal whose direction changes.

A low temperature co-fired ceramic (LTCC) technology is a technology in which low-temperature sintered ceramic powders are made into a precise and compact porcelain strip, a required circuit pattern is produced on the porcelain strip by using a process such as laser puncturing, micro-hole grouting, and precision conductor paste printing, a plurality of components (such as a capacitor, a resistor, and a coupler) are buried in a multi-layer ceramic substrate, then laminated together, and sintered at 900° C. to make a high-density circuit or circuit substrate without mutual interference. This technology may implement circuit miniaturization and densification, and is particularly applicable to a component for high-frequency communication.

Beamforming is a technology in which a weighting coefficient of each antenna unit in an antenna array is adjusted, so that the antenna array generates a directional beam, and the antenna array obtains a significant array gain.

Vertical polarization means that an electric field intensity direction formed during antenna radiation is perpendicular to the ground plane.

Horizontal polarization means that an electric field intensity direction formed during antenna radiation is parallel to the ground plane.

A multiple-input multiple-output (MIMO) technology is a technology in which a plurality of antennas are used at a transmission end (that is, a sending end and a receiving end) to send a signal or receive a signal, to improve communication quality. In this technology, a signal may be sent or received by using a plurality of antennas at the transmission end.

A relative dielectric constant is a physical parameter used to represent a dielectric property or a polarization property of a dielectric material.

A floor is a part that may be used as a virtual ground in a terminal device, for example, a printed circuit board (PCB) in the terminal device or a display of the terminal device.

Embodiments of the present disclosure provide an antenna unit and a terminal device. The antenna unit may include an insulating groove, M feeding parts disposed in the insulating groove, M couplers, a first insulator, at least two radiators carried on the first insulator, a first radiator disposed at a bottom of the insulating groove, and an isolator disposed around the M couplers, where the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer. According to this solution, on one hand, because the coupler is coupled to the at least two radiators and the first radiator, in a case that the coupler receives an alternating current signal, the coupler may be coupled to the at least two radiators and the first radiator, so that the at least two radiators and the first radiator can generate an induced alternating current signal, and the at least two radiators and the first radiator can generate electromagnetic waves of a specific frequency. In addition, because resonance frequencies of different radiators are different, frequencies of electromagnetic waves generated by the at least two radiators and the first radiator are also different, so that the antenna unit can cover different frequency bands, that is, frequency bands covered by the antenna unit can be increased. On the other hand, the isolator is disposed around the M couplers in the antenna unit. Therefore, the isolator may isolate electromagnetic waves radiated by the at least two radiators and the first radiator in a direction of the isolator, so that a maximum radiation direction of the electromagnetic waves generated by the at least two radiators and the first radiator faces an opening direction of the insulating groove. Thus, radiation intensity of the antenna unit in a radiation direction of the antenna unit can be improved while directionality of the antenna unit is ensured. In this way, frequency bands covered by the antenna unit can be increased, and radiation intensity of the antenna unit in the radiation direction of the antenna unit can be improved. Therefore, performance of the antenna unit can be improved.

The antenna unit provided in the embodiments of the present disclosure may be applied to a terminal device, or may be applied to another electronic device that needs to use the antenna unit. This may be determined based ono an actual use requirement, and is not limited in the embodiments of the present disclosure. The following uses an example in which the antenna unit is applied to the terminal device to describe the antenna unit provided in the embodiments of the present disclosure.

The following describes the antenna unit provided in the embodiments of the present disclosure with reference to the accompanying drawings.

Figure 2:
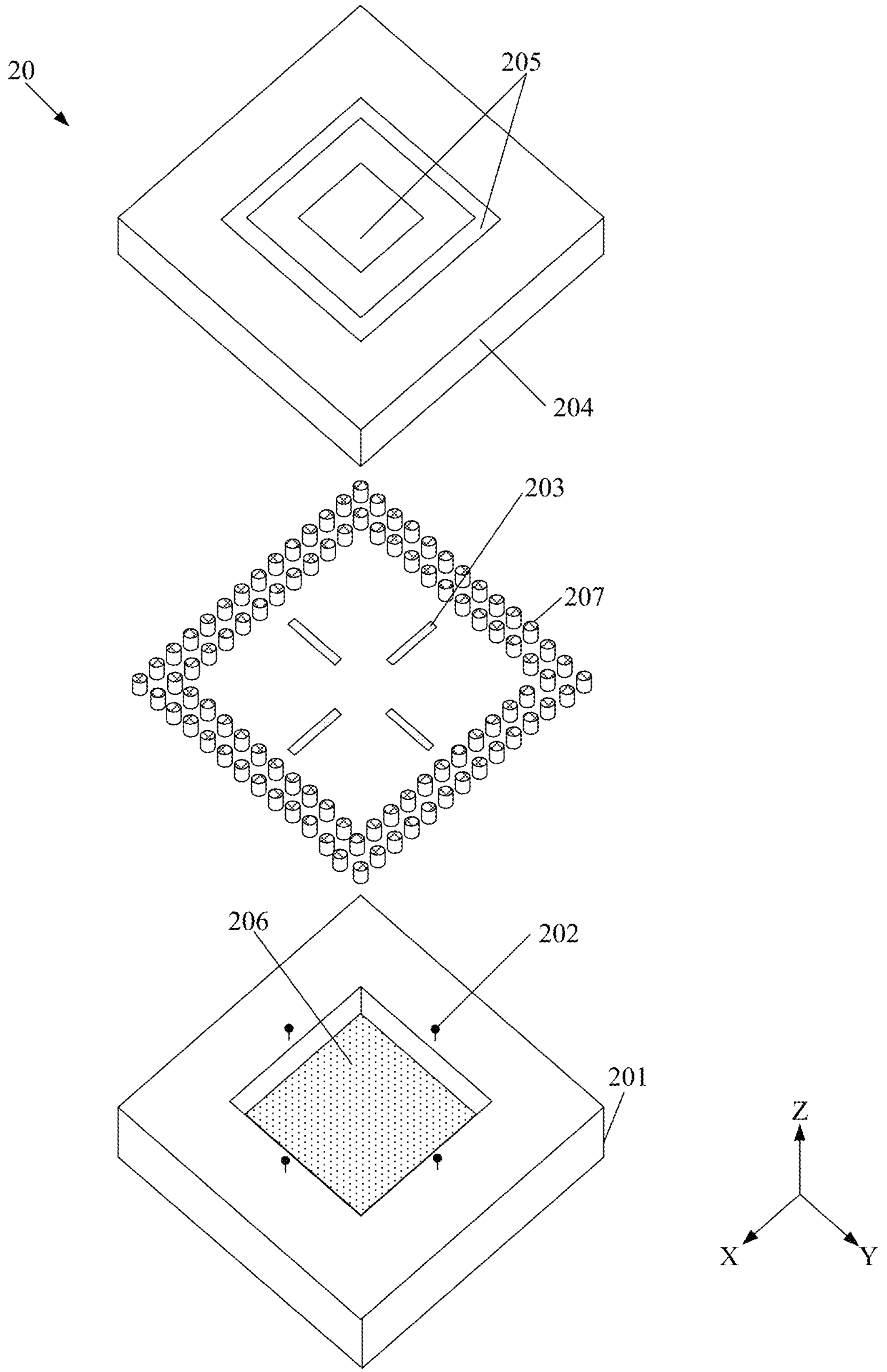
FIG. 2 is an exploded view 1 of an antenna unit according to an embodiment of the present disclosure.

As shown in FIG. 2, FIG. 2 is a schematic diagram of an exploded view of a structure of an antenna unit according to an embodiment of the present disclosure. In FIG. 2, an antenna unit 20 may include an insulating groove 201, M feeding parts 202 disposed in the insulating groove 201, M couplers 203, a first insulator 204, at least two radiators 205 carried on the first insulator, a first radiator 206 disposed at a bottom of the insulating groove 201, and an isolator 207 disposed around the M couplers 203.

The M feeding parts 202 may be insulated from the first radiator 206 and the isolator 207, the M couplers 203 may be located between the first radiator 206 and the first insulator 204, each of the M feeding parts 202 may be electrically connected to one coupler 202, each of the M couplers 202 may be coupled to the at least two radiators 205 and the first radiator 206, resonance frequencies of different radiators are different, and M is a positive integer.

It should be noted that in this embodiment of the present disclosure, to show the structure of the antenna unit more clearly, FIG. 2 is the schematic diagram of the exploded view of the structure of the antenna unit, that is, all components of the antenna unit are shown in a separate state. In actual implementation, the insulating groove, the feeding part, the coupler, the first insulator, the at least two radiators, the first radiator, and the isolator form a whole to form the antenna unit provided in this embodiment of the present disclosure.

In addition, the feeding part 202 and the coupler 203 in FIG. 2 are not shown in an electrically connected state. In actual implementation, the feeding part 202 may be electrically connected to the coupler 203.

Optionally, in this embodiment of the present disclosure, the antenna unit provided in this embodiment of the present disclosure may be made by using an LTCC technology. The insulating groove may be made by using the LTCC technology.

It should be noted that, in actual implementation, the antenna unit provided in this embodiment of the present disclosure may also be made by using any other possible technology. This may be determined based on an actual use requirement, and is not limited in the embodiments of the present disclosure.

Optionally, in this embodiment of the present disclosure, a relative dielectric constant of a material of the insulating groove may be less than or equal to 5.

In this embodiment of the present disclosure, the relative dielectric constant of the material of the insulating groove may be greater than or equal to 2 and is less than or equal to 5.

Optionally, in this embodiment of the present disclosure, the material of the insulating groove may be any possible material such as ceramic or plastic. This may be determined based on an actual use requirement, and is not limited in the embodiments of the present disclosure.

It should be noted that in this embodiment of the present disclosure, if the relative dielectric constant of the material of the insulating groove is smaller, the insulating groove results in weaker interference to other components in the antenna unit, and performance of the antenna unit is more stable.

Optionally, in this embodiment of the present disclosure, the insulating groove may be a rectangular groove. The insulating groove may be a square groove.

Optionally, in this embodiment of the present disclosure, an opening shape of the insulating groove may be a square. Certainly, in actual implementation, the opening shape of the insulating groove may also be any possible shape. This may be determined based on an actual use requirement, and is not limited in this embodiment of the present disclosure.

Optionally, in this embodiment of the present disclosure, the first radiator may be a metal sheet disposed at the bottom of the insulating groove, or may be a metal material sprayed at the bottom of the insulating groove, or the like. Certainly, the first radiator may also be disposed in the insulating groove in any other possible form. This may be determined based on an actual use requirement, and is not limited in this embodiment of the present disclosure.

In this embodiment of the present disclosure, to describe the antenna unit provided in this embodiment of the present disclosure and its operating principle, the following uses an antenna unit as an example to describe an operating principle of sending and receiving a signal by the antenna unit.

For example, with reference to FIG. 2, in this embodiment of the present disclosure, when the terminal device sends a 5G millimeter-wave signal, a signal source in the terminal device sends an alternating current signal, and the alternating current signal may be transmitted to a coupler by using a feeding part. Then, after the coupler receives the alternating current signal, on one hand, the coupler may be coupled to the at least two radiators, so that the at least two radiators generate an induced alternating current signal, and then the at least two radiators may radiate an electromagnetic wave of a specific frequency (for example, in an opening direction of the insulating groove). On the other hand, the coupler may further be coupled to the first radiator, so that the first radiator generates an induced alternating current signal.

Then, the first radiator may radiate an electromagnetic wave of a specific frequency (because a resonance of the first radiator is different from a resonance of the at least two radiators, a frequency of the electromagnetic wave radiated by the first radiator is different from a frequency of the electromagnetic wave radiated by the at least two radiators). In this way, the terminal device may send a signal by using the antenna unit provided in this embodiment of the present disclosure.

For another example, in this embodiment of the present disclosure, when the terminal device receives a 5G millimeter-wave signal, an electromagnetic wave in space in which the terminal device is located may excite the at least two radiators and the first radiator, so that the at least two radiators and the first radiator generate an induced alternating current signal. After the at least two radiators and the first radiator generate the induced alternating current signal, the at least two radiators and the first radiator may be separately coupled to the coupler, so that the coupler generates an induced alternating current signal. Then, the coupler may input the alternating current signal to a receiver in the terminal device by using the feeding part, so that the terminal device can receive a 5G millimeter-wave signal sent by another device. That is, the terminal device may receive a signal by using the antenna unit provided in this embodiment of the present disclosure.

According to the antenna unit provided in this embodiment of the present invention, in one aspect, because the coupler is coupled to the at least two radiators and the first radiator, in a case that the coupler receives an alternating current signal, the coupler may be coupled to the at least two radiators and the first radiator, so that the at least two radiators and the first radiator can generate an induced alternating current signal, and the at least two radiators and the first radiator can generate electromagnetic waves of a specific frequency. In addition, because resonance frequencies of different radiators are different, frequencies of electromagnetic waves generated by the at least two radiators and the first radiator are also different, so that the antenna unit can cover different frequency bands, that is, frequency bands covered by the antenna unit can be increased. On the other hand, the isolator is disposed around the M couplers in the antenna unit. Therefore, the isolator may isolate electromagnetic waves radiated by the at least two radiators and the first radiator in a direction of the isolator, so that a maximum radiation direction of the electromagnetic waves generated by the at least two radiators and the first radiator faces an opening direction of the insulating groove. Thus, radiation intensity of the antenna unit in a radiation direction of the antenna unit can be improved while directionality of the antenna unit is ensured. In this way, frequency bands covered by the antenna unit can be increased, and radiation intensity of the antenna unit in the radiation direction of the antenna unit can be improved. Therefore, performance of the antenna unit can be improved.

Figure 3:
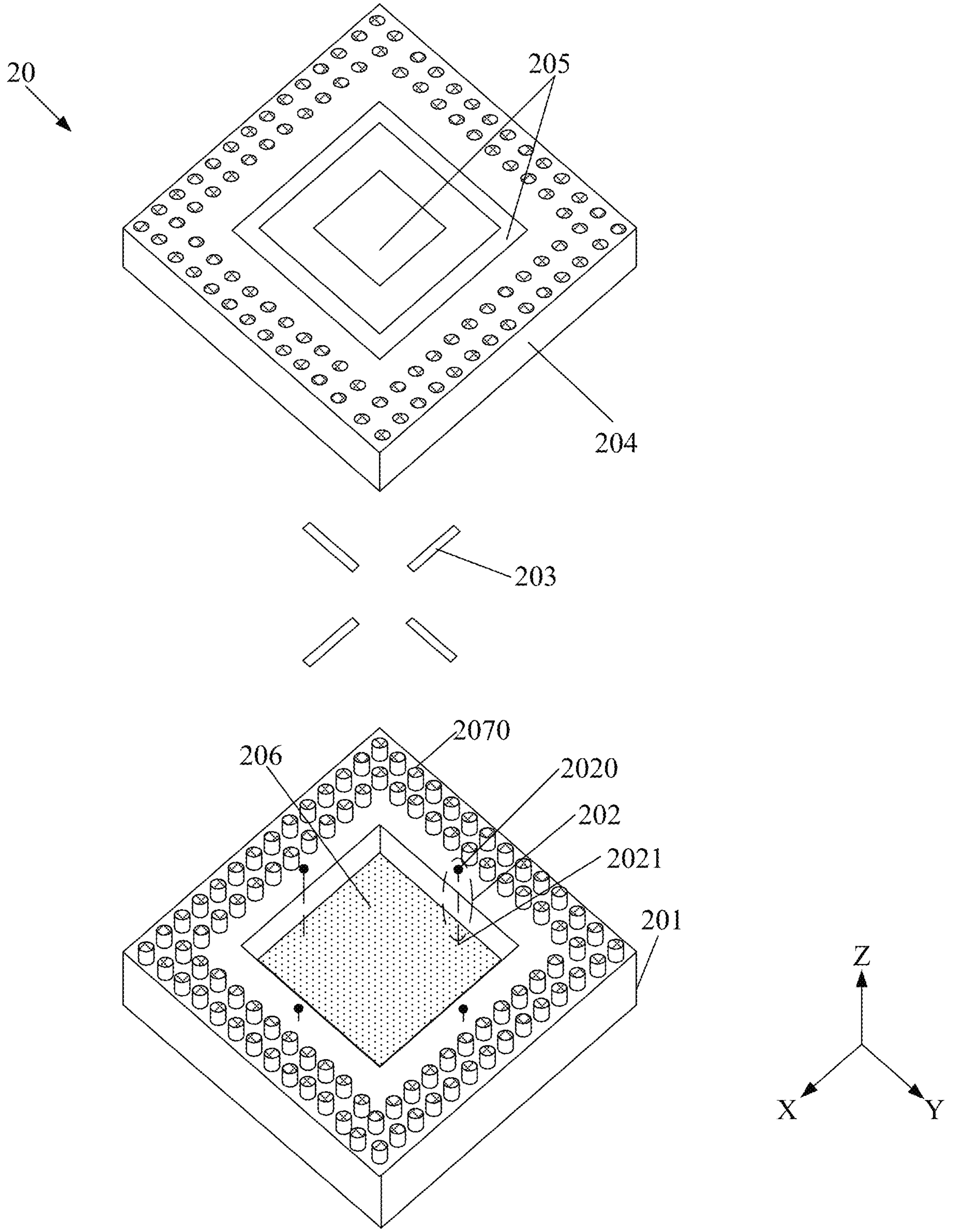
FIG. 3 is an exploded view 2 of an antenna unit according to an embodiment of the present disclosure.

Optionally, in this embodiment of the present disclosure, with reference to FIG. 2, as shown in FIG. 3, the feeding part 202 may be disposed on an opening edge of the insulating groove 201 and penetrates through the insulating groove 201.

It should be noted that, because the feeding part penetrates through the insulating groove, a part of the feeding part 202 in the insulating groove 201 in FIG. 3 is shown by dashed lines.

In actual implementation, as shown in FIG. 3, in this embodiment of the present disclosure, a first end 2020 of the feeding part 202 may be electrically connected to the coupler 203, and a second end 2021 of the feeding part 202 may be connected to a signal source in the terminal device (for example, a 5G signal source in the terminal device). In this way, a current of the signal source in the terminal device may be transmitted to the coupler by using the feeding part, and then coupled to the at least two radiators and the first radiator by using the coupler, so that the at least two radiators and the first radiator can generate an induced current, and the at least two radiators and the first radiator can generate an electromagnetic wave, to radiate a 5G millimeter-wave signal in the terminal device.

It should be noted that in this embodiment of the present disclosure, because a groove in the antenna unit is an insulating groove (an electromagnetic wave emitted by the antenna unit cannot be isolated by using an insulating material), to ensure directivity of the antenna unit, the isolator may be disposed around the M couplers, so that the antenna unit has directivity.

Optionally, in this embodiment of the present disclosure, the isolator may be any component that has an isolation function, such as a metal sheet or a metal post disposed around the M couplers. This may be determined based on an actual use requirement, and is not limited in this embodiment of the present disclosure.

Optionally, in this embodiment of the present disclosure, the isolator may be disposed on an outer side of the insulating groove, for example, a component that surrounds the insulating groove, the M couplers, and the first insulator. The isolator may further be embedded in the insulating groove and the first insulator, and disposed around the M couplers, so that these components form a whole, that is, the antenna unit provided in this embodiment of the present disclosure. This may be determined based on an actual use requirement, and is not limited in the embodiments of the present disclosure.

Certainly, in actual implementation, the isolator may also be disposed in any other possible form. This may be determined based on an actual use requirement, and is not limited in this embodiment of the present disclosure.

Optionally, in this embodiment of the present disclosure, the isolator may include N first metal posts, and N is a positive integer.

In this embodiment of the present disclosure, the N first metal posts may not only be configured to isolate electromagnetic waves radiated by the at least two radiators in a direction of the first metal post, but may also be configured to isolate an electromagnetic wave radiated by the first radiator in the direction of the first metal post. Therefore, a length of the first metal post may be greater than or equal to a maximum distance (referred to as a first length for short) between the at least two radiators and an outer surface of the bottom of the insulating groove, so that a maximum radiation direction of electromagnetic waves generated by a target radiator and the first radiator may be directed toward an opening direction of the insulating groove, thereby improving a radiation effect of the antenna unit while ensuring directionality of the antenna unit.

Optionally, in this embodiment of the present disclosure, as shown in FIG. 3, N first metal posts 2070 may be disposed on an opening edge of the insulating groove 201 and embedded in the insulating groove 201 and the first insulator 204.

It should be noted that a circular filling part on the first insulator 204 in FIG. 3 is used to indicate that the first metal post 2070 is embedded in the first insulator 204. Certainly, in actual implementation, the first metal post may further be embedded in the insulating groove 201. FIG. 3 does not show a part of the first metal post 2070 embedded in the insulating groove 201.

Optionally, in this embodiment of the present disclosure, the N first metal posts may be located on an outer side of the M feeding parts, that is, a distance (referred to as a first distance for short) between each of the N first metal posts and the opening of the insulating groove is greater than a distance (referred to as a second distance for short) between each of the M feeding parts and the opening of the insulating groove.

Optionally, in this embodiment of the present disclosure, the N first metal posts may be evenly disposed on the opening edge of the insulating groove. In other words, there is an equal distance between any two adjacent metal posts in the N first metal posts.

For example, as shown in FIG. 3, the N first metal posts 2070 may be disposed on the opening edge of the insulating groove 201. The opening edge of the insulating groove 201 may include four sides, and the N first metal posts 2070 may be evenly distributed on the four sides.

Optionally, in this embodiment of the present disclosure, a diameter of the first metal post may be determined based on a size of the insulating groove. The diameter of the first metal post may be determined based on a width of the opening edge of the insulating groove.

It should be noted that in this embodiment of the present disclosure, a smaller distance between two adjacent metal posts in the N first metal posts leads to a better effect of isolating, by the N first metal posts, electromagnetic waves radiated by the at least two radiators and the first radiator in a direction of the N first metal posts. That is, the tighter the first metal post disposed in the antenna unit, the better the radiation effect of the antenna unit.

Optionally, in this embodiment of the present disclosure, the distance between the two adjacent metal posts in the N first metal posts may be less than or equal to a first target value. The first target value may be a quarter of a minimum wavelength of the electromagnetic waves generated by coupling the at least two radiators and the first radiator with the M couplers.

Optionally, in this embodiment of the present disclosure, the isolator may further include P second metal posts, and the P second metal posts may be disposed on an inner side of the N first metal posts. That is, the N first metal posts may surround the P second metal posts.

A length of each of the P second metal posts may be less than a length of the N first metal posts, and P is a positive integer.

In this embodiment of the present disclosure, the P second metal posts may also be disposed on the opening edge of the insulating groove, and are located on the inner side of the N first metal posts, that is, a distance (referred to as a third distance for short) between each of the P second metal posts and the opening of the insulating groove is greater than the second distance (that is, the distance between each of the M feeding parts and the opening of the insulating groove), and is less than the first distance (that is, the distance between each of the N first metal posts and the opening of the insulating groove).

In this embodiment of the present disclosure, when a distance between the second metal post and the M couplers is relatively small, in a process in which the antenna unit provided in this embodiment of the present disclosure operates, the second metal post may interfere with the M couplers, thereby affecting operating performance of the antenna unit. Therefore, the length of the second metal post may be less than a distance (referred to as a second length for short) between the M couplers and the outer surface of the bottom of the insulating groove, so that the second metal post and the M couplers can be kept a specified distance, thereby ensuring relatively stable performance of the antenna provided in this embodiment of the present disclosure.

Optionally, in this embodiment of the present disclosure, the P second metal posts may be evenly disposed on the opening edge of the insulating groove. In other words, there is an equal distance between any two adjacent metal posts in the P second metal posts.

Optionally, in this embodiment of the present disclosure, a diameter of the second metal post may be determined based on a size of the insulating groove. The diameter of the second metal post may be determined based on a width of the opening edge of the insulating groove.

It should be noted that in this embodiment of the present disclosure, a smaller distance between two adjacent metal posts in the P second metal posts leads to a better effect of isolating, by the P second metal posts, an electromagnetic wave radiated by the first radiator in a direction of the P second metal posts. That is, the tighter the second metal post disposed in the antenna unit, the better the radiation effect of the antenna unit.

Optionally, in this embodiment of the present disclosure, the distance between the two adjacent metal posts in the P second metal posts may be less than or equal to a second target value. The second target value may be a quarter of a wavelength of the electromagnetic wave generated by coupling the first radiator with the M couplers.

Figure 4:
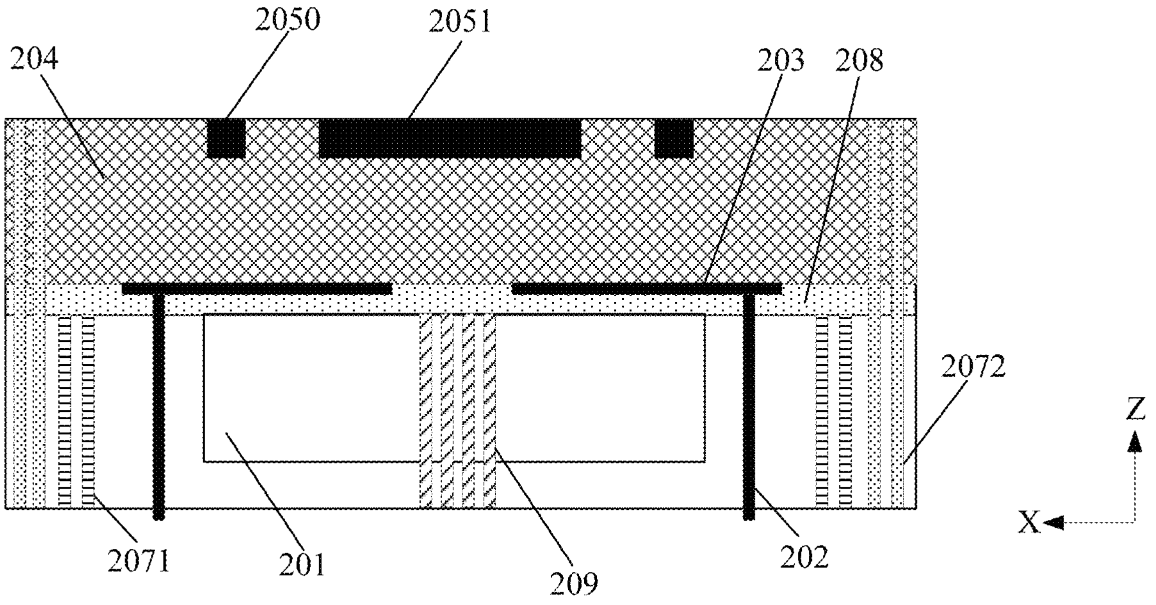
FIG. 4 is a sectional view of an antenna unit according to an embodiment of the present disclosure.

For example, as shown in FIG. 4, FIG. 4 is a sectional view of the antenna unit provided in this embodiment of the present disclosure in a Z-axis direction. In FIG. 4, N first metal posts 2070 and P second metal posts 2071 may be disposed on the opening edge of the insulating groove 201. A length of the first metal post 2070 is equal to a distance (that is, the foregoing first length) between the at least two radiators 205 and the outer surface of the bottom of the insulating groove 201. A length of the second metal post 2071 is less than a distance (that is, the foregoing second length) between the M couplers 203 and the outer surface of the bottom of the insulating groove 201, and a distance (that is, the foregoing third distance) between the second metal post 2071 and the opening of the insulating groove 201 is greater than a distance (that is, the foregoing second distance) between the feeding part 202 and the opening of the insulating groove 201, and is less than a distance (the foregoing first distance) between the first metal post 2070 and the opening of the insulating groove 201.

In this embodiment of the present disclosure, the P second metal posts are disposed on the inner side of the N first metal posts. Therefore, a distance between the P second metal posts and a sidewall of the insulating groove is less than a distance between the N first metal posts and the sidewall of the insulating groove. In this way, the P second metal posts can better isolate the electromagnetic wave generated by coupling the first radiator with the M couplers, so that a maximum radiation direction of an electromagnetic wave generated by the first radiator can face an opening direction of the insulating groove, thereby increasing a concentration degree of an electromagnetic wave radiated by the antenna unit, and improving a radiation effect of the antenna unit.

Optionally, in this embodiment of the present disclosure, each of the M couplers may be a metal sheet. For example, each of the M couplers may be a copper sheet.

Optionally, in this embodiment of the present disclosure, a shape of the M couplers may be any possible shape such as a rectangle.

Certainly, in actual implementation, the M couplers may also be of any possible material and shape. This may be determined based on an actual use requirement, and is not limited in this embodiment of the present disclosure.

Optionally, in this embodiment of the present disclosure, the M couplers may be four couplers (that is, M=4), the four couplers may form two coupler groups, each coupler group may include two symmetrically disposed couplers and a symmetry axis of one coupler group is orthogonal to a symmetry axis of the other coupler group.

An amplitude of a signal source connected to a first feeding part is equal to an amplitude of a signal source connected to a second feeding part, a phase difference is 180 degrees, and the first feeding part and the second feeding part are feeding parts electrically connected to two couplers in a same coupler group.

In this embodiment of the present disclosure, the antenna unit may include two coupler groups. Therefore, the terminal device may separately send a signal or receive a signal by using the two coupler groups in the antenna unit, that is, a MIMO technology may be implemented by using the antenna unit provided in this embodiment of the present disclosure. In this way, a communication capacity and a communication rate of the antenna unit can be improved.

It should be noted that, for ease of description and understanding, the two coupler groups are a first coupler group and a second coupler group in the following embodiment. The first coupler group and the second coupler group each include two symmetrically disposed couplers, and a symmetry axis of the first coupler group is orthogonal to a symmetry axis of the second coupler group.

Optionally, in this embodiment of the present disclosure, the first coupler group and the second coupler group may be two coupler groups corresponding to different polarizations. The first coupler group may be a coupler group corresponding to a first polarization, and the second coupler group may be a coupler group corresponding to a second polarization.

Figure 5:
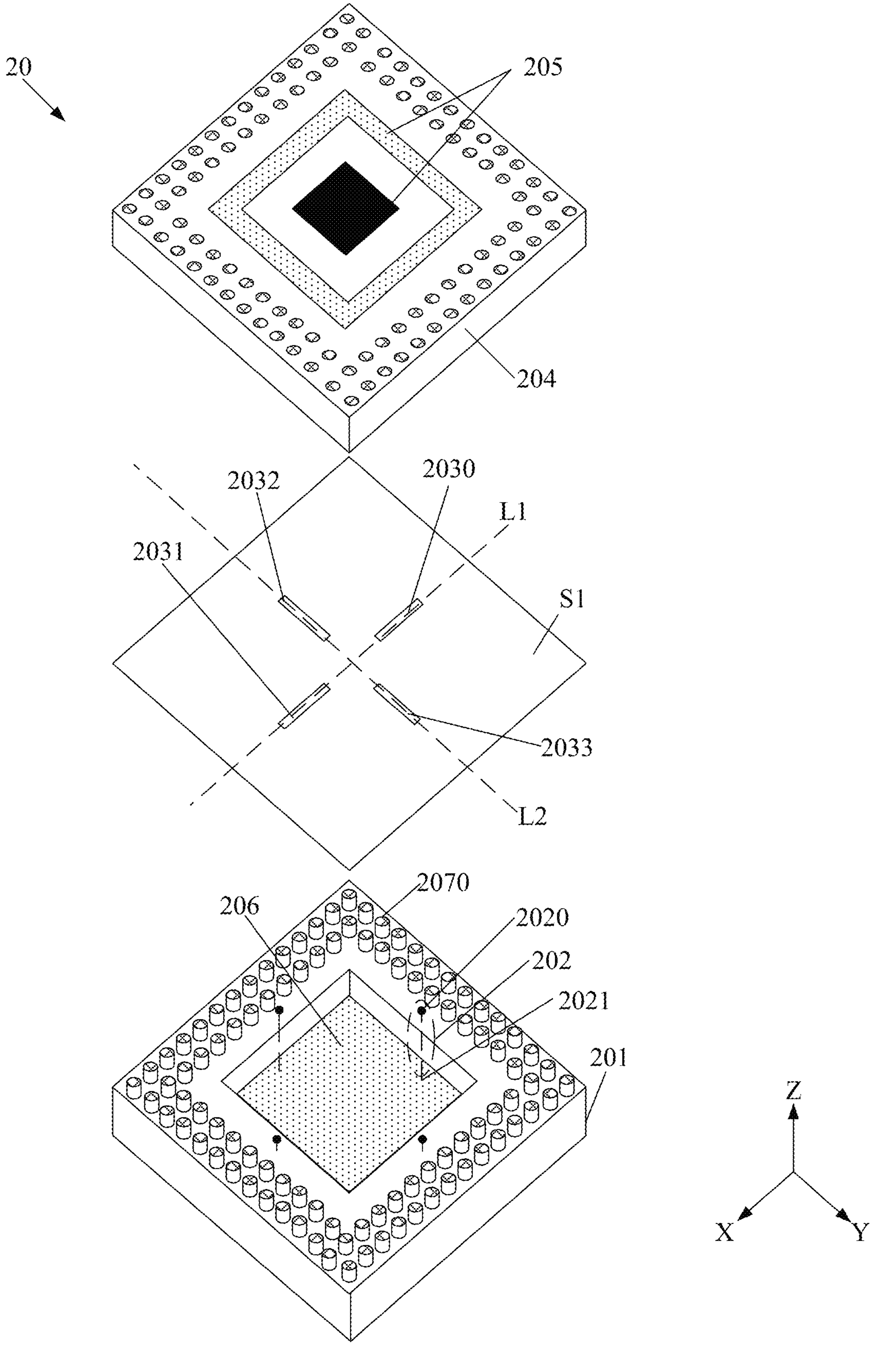
FIG. 5 is an exploded view 3 of an antenna unit according to an embodiment of the present disclosure.

For example, with reference to FIG. 3, as shown in FIG. 5, the first coupler group may include a coupler 2030 and a coupler 2031, and the second coupler group may include a coupler 2032 and a coupler 2033. The first coupler group formed by the coupler 2030 and the coupler 2031 may be a coupler group corresponding to the first polarization (for example, a vertically polarized coupler group). The second coupler group formed by the coupler 2032 and the coupler 2033 may be a coupler group corresponding to the second polarization (for example, a horizontally polarized coupler group).

Optionally, in this embodiment of the present disclosure, the two coupler groups may be two coupler groups corresponding to different polarizations, that is, the first polarization and the second polarization may be polarizations in different directions.

It should be noted that, in this embodiment of the present disclosure, a polarization form of the foregoing two coupler groups may be any possible polarization form. This may be determined based on an actual use requirement, and is not limited in the embodiments of the present disclosure.

In this embodiment of the present disclosure, the first coupler group and the second coupler group may be two coupler groups corresponding to different polarizations. Therefore, the antenna unit provided in this embodiment of the present disclosure may form a dual-polarized antenna unit. In this way, a probability of communication disconnection of the antenna unit can be reduced, that is, a communication capability of the antenna unit can be improved.

Optionally, in this embodiment of the present disclosure, for the two couplers in the first coupler group, amplitudes of signal sources connected to two feeding parts electrically connected to the two couplers may be equal, and a difference between phases of the signal sources connected to the two feeding parts electrically connected to the two couplers may be 180 degrees.

Correspondingly, for the two couplers in the second coupler group, amplitudes of signal sources connected to two feeding parts electrically connected to the two couplers may be equal, and a difference between phases of the signal sources connected to the two feeding parts electrically connected to the two couplers may be 180 degrees.

In this embodiment of the present disclosure, when one coupler in the first coupler group is in an operating state, the other coupler in the first coupler group may also be in an operating state. Correspondingly, when one coupler in the second coupler group is in an operating state, the other coupler in the second coupler group may also be in an operating state. That is, couplers in a same coupler group may operate simultaneously.

Optionally, in this embodiment of the present disclosure, when a coupler in the first coupler group is in an operating state, a coupler in the second coupler group may be in an operating state, or may not be in an operating state. This may be determined based on an actual use requirement, and is not limited in the embodiments of the present disclosure.

In this embodiment of the present disclosure, the first coupler group is orthogonal to the second coupler group, and amplitudes of signal sources connected to two feeding parts electrically connected to two couplers in a same coupler group are equal, and a phase difference is 180 degrees. That is, a feeding manner used by the antenna unit provided in this embodiment of the present disclosure is a differential orthogonal feeding manner. Therefore, a communication capacity and a communication rate of the antenna unit can be further improved.

Optionally, in this embodiment of the present disclosure, the two coupler groups may be located on a same plane, and a coupler in any one coupler group may be distributed on a symmetry axis of the other coupler group.

For example, as shown in FIG. 5, both the first coupler group and the second coupler group are located on a first plane S1, that is, the coupler 2030 and the coupler 2031 in the first coupler group are located on the first plane S1, and the coupler 2032 and the coupler 2033 in the second coupler group are located on the first plane S1. In addition, as shown in FIG. 5, the coupler 2030 and the coupler 2031 in the first coupler group are located on a symmetry axis (that is, a first symmetry axis) L1 of the second coupler group, and the coupler 2032 and the coupler 2033 in the second coupler group are located on a symmetry axis (that is, a second symmetry axis) L2 of the first coupler group.

In this embodiment of the present disclosure, in a case that there is an equal distance between each of the M couplers and a radiator (for example, the foregoing at least two radiators or the first radiator), a parameter of coupling between the M couplers and the radiator, such as an induced current generated in a coupling process, may be controlled. Therefore, both the foregoing two coupler groups may be disposed on a same plane, and a coupler in any one coupler group is disposed on a symmetry axis of the other coupler group, so that distances between different couplers and the radiator are equal. In this way, an operating state of the antenna unit can be easily controlled.

Optionally, in this embodiment of the present disclosure, a shape of the first insulator may be the same as the opening shape of the insulating groove, for example, any possible shape such as a square or a cylinder.

It should be noted that in this embodiment of the present disclosure, the shape of the first insulator may be any shape that can meet an actual use requirement. This is not limited in this embodiment of the present disclosure, and may be determined based on actual use requirement.

Optionally, in this embodiment of the present disclosure, a material of the first insulator may be an insulating material with a relatively small relative dielectric constant and a relatively small loss angle tangent value.

Optionally, in this embodiment of the present disclosure, the material of the first insulator may be any possible material such as plastic or foam. This may be determined based on an actual use requirement, and is not limited in the embodiments of the present disclosure.

For example, in this embodiment of the present disclosure, a relative dielectric constant of the material of the first insulator may be 2.2, and a loss angle tangent value may be 0.0009.

In this embodiment of the present disclosure, the first insulator may carry not only the at least two radiators, but also isolate the at least two radiators and the M couplers, to avoid interference between the at least two radiators and the M couplers.

It should be noted that in this embodiment of the present disclosure, on the premise that the at least two radiators are carried, if a relative dielectric constant and a loss angle tangent value of the material of the first insulator are smaller, the first insulator has less impact on the radiation effect of the antenna unit. That is, if the relative dielectric constant and the loss angle tangent value of the material of the first insulator are smaller, the first insulator has less impact on operating performance of the antenna unit and the radiation effect of the antenna unit is better.

Optionally, in this embodiment of the present disclosure, the at least two radiators may include a second radiator and a third radiator.

It can be understood that the second radiator and the third radiator are different radiators, and a resonance frequency of the second radiator is different from a resonance frequency of the third radiator.

Optionally, in this embodiment of the present disclosure, the second radiator may be a ring radiator, and the third radiator may be a polygon radiator.

Optionally, in this embodiment of the present disclosure, the ring radiator may be a ring radiator of any possible shape, such as a rectangular ring radiator or a square ring radiator. The polygon radiator may be any possible polygon radiator such as a rectangular radiator, a square radiator, or a hexagonal radiator. This may be determined based on an actual use requirement, and is not limited in the embodiments of the present disclosure.

Optionally, in this embodiment of the present disclosure, the ring radiator may be a closed ring radiator, that is, sides of the ring radiator are successively continuous. The ring radiator may also be a semi-closed ring radiator, that is, the sides of the ring radiator are partially continuous. This may be determined based on an actual use requirement, and is not limited in the embodiments of the present disclosure.

Optionally, in this embodiment of the present disclosure, an area of the second radiator may be greater than an area of the third radiator.

Optionally, in this embodiment of the present disclosure, the third radiator (that is, a polygon radiator) may be located in the middle of the second radiator (that is, a ring radiator).

Certainly, in actual implementation, shapes of the second radiator and the third radiator may also be any possible shapes. This may be determined based on an actual use requirement, and is not limited in this embodiment of the present disclosure.

In this embodiment of the present disclosure, because resonance frequencies of different radiators are different, when the first radiator, the second radiator, and the third radiator are different radiators, and the first radiator, the second radiator, and the third radiator are located in different locations in the antenna unit, the first radiator, the second radiator, and the third radiator may be coupled to the M couplers to generate electromagnetic waves of different frequencies. In this way, the antenna unit can cover different frequency bands, that is, frequency bands covered by the antenna unit can be increased, thereby improving performance of the antenna unit.

Optionally, in this embodiment of the present disclosure, the resonance frequency of the first radiator may be a first frequency, the resonance frequency of the second radiator may be a second frequency, and the resonance frequency of the third radiator may be a third frequency.

The first frequency may be less than the second frequency, and the second frequency may be less than the third frequency.

In this embodiment of the present disclosure, because resonance frequencies of different radiators are different, the resonance frequencies of the first radiator, the second radiator, and the third radiator may be different frequencies.

Optionally, in this embodiment of the present disclosure, the first frequency may be in a first frequency range, the second frequency may be in a second frequency range, and the third frequency may be in a third frequency range.

The first frequency range may be 24 GHz-27 GHz, the second frequency range may be 27 GHz-30 GHz, and the third frequency range may be 37 GHz-43 GHz.

Figure 6:
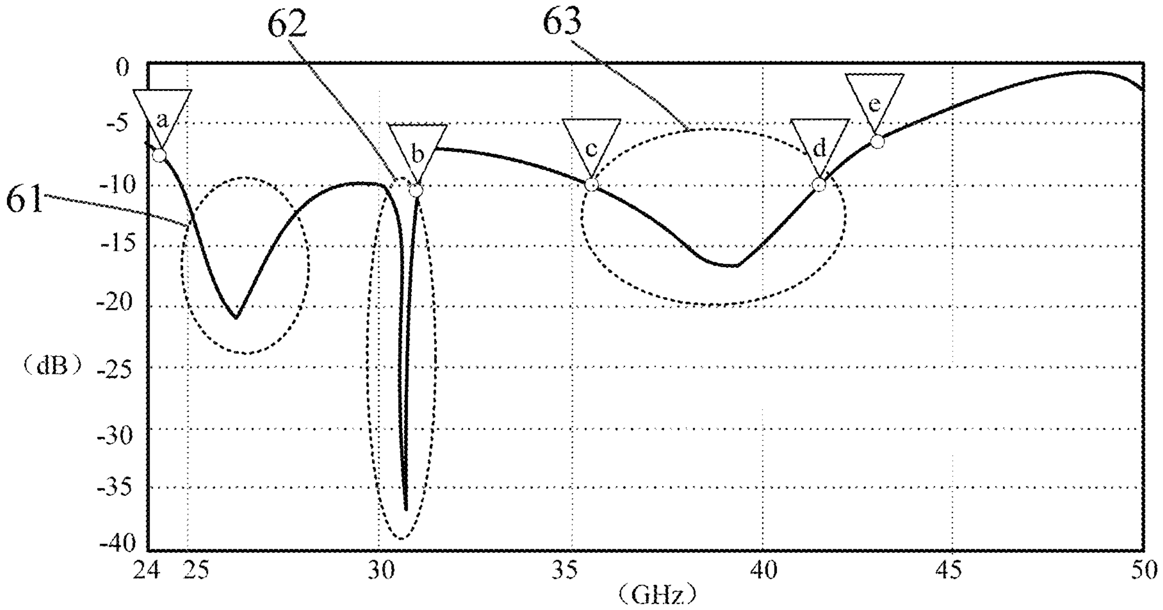
FIG. 6 is a reflection coefficient diagram of an antenna unit according to an embodiment of the present disclosure.

For example, it is assumed that the second radiator is a ring radiator, and the third radiator is a polygon radiator. As shown in FIG. 6, FIG. 6 is a reflection coefficient diagram of the antenna unit when the antenna unit provided in this embodiment of the present disclosure operates. A frequency of an electromagnetic wave generated by coupling the M couplers with the first radiator may be in a frequency range indicated by 61 in FIG. 6, that is, the resonance frequency of the first radiator is in the frequency range indicated by 61 in FIG. 6. A frequency of an electromagnetic wave generated by coupling the M couplers with a ring radiator (that is, the second radiator) may be in a frequency range indicated by 62 in FIG. 6, that is, a resonance frequency of the ring radiator is in the frequency range indicated by 62 in FIG. 6. A frequency of an electromagnetic wave generated by coupling the M couplers with a polygon radiator (that is, the third radiator) may be in a frequency range indicated by 63 in FIG. 6, that is, a resonance frequency of the polygon radiator is in the frequency range indicated by 63 in FIG. 6. In addition, it can be seen from FIG. 6 that coupling between the coupler and the first radiator may generate a low-frequency electromagnetic wave, and coupling between the coupler and the second radiator may generate a near low-frequency electromagnetic wave. In this way, the antenna unit provided in this embodiment of the present disclosure may cover a frequency range of 24.25 GHz-29.5 GHz (for example, n257, n258, and n261), so that a low-frequency bandwidth of the antenna unit can be broadened. Coupling between the coupler and the third radiator may generate a high-frequency electromagnetic wave. In this way, the antenna unit provided in this embodiment of the present disclosure may cover a frequency range of 37 GHz-43 GHz (for example, n259 and n260). In view of the above, the antenna unit provided in this embodiment of the present disclosure may cover most 5G millimeter-wave frequency bands (for example, planned 5G millimeter-wave frequency bands such as n257, n258, n259, n260, and n261), so that antenna performance of the terminal device can be improved.

It should be noted that, a point a, a point b, a point c, a point d, and a point e in FIG. 6 are used to mark echo loss values. It can be learned from FIG. 6 that the echo loss values marked by the point a, the point b, the point c, the point d, and the point e are all less than −6 dB. That is, the antenna unit provided in this embodiment of the present disclosure may meet an actual use requirement.

Optionally, in this embodiment of the present disclosure, the antenna unit may further include a second insulator disposed between the first radiator and the first insulator, and the M couplers may be carried on the second insulator.

Figure 7:
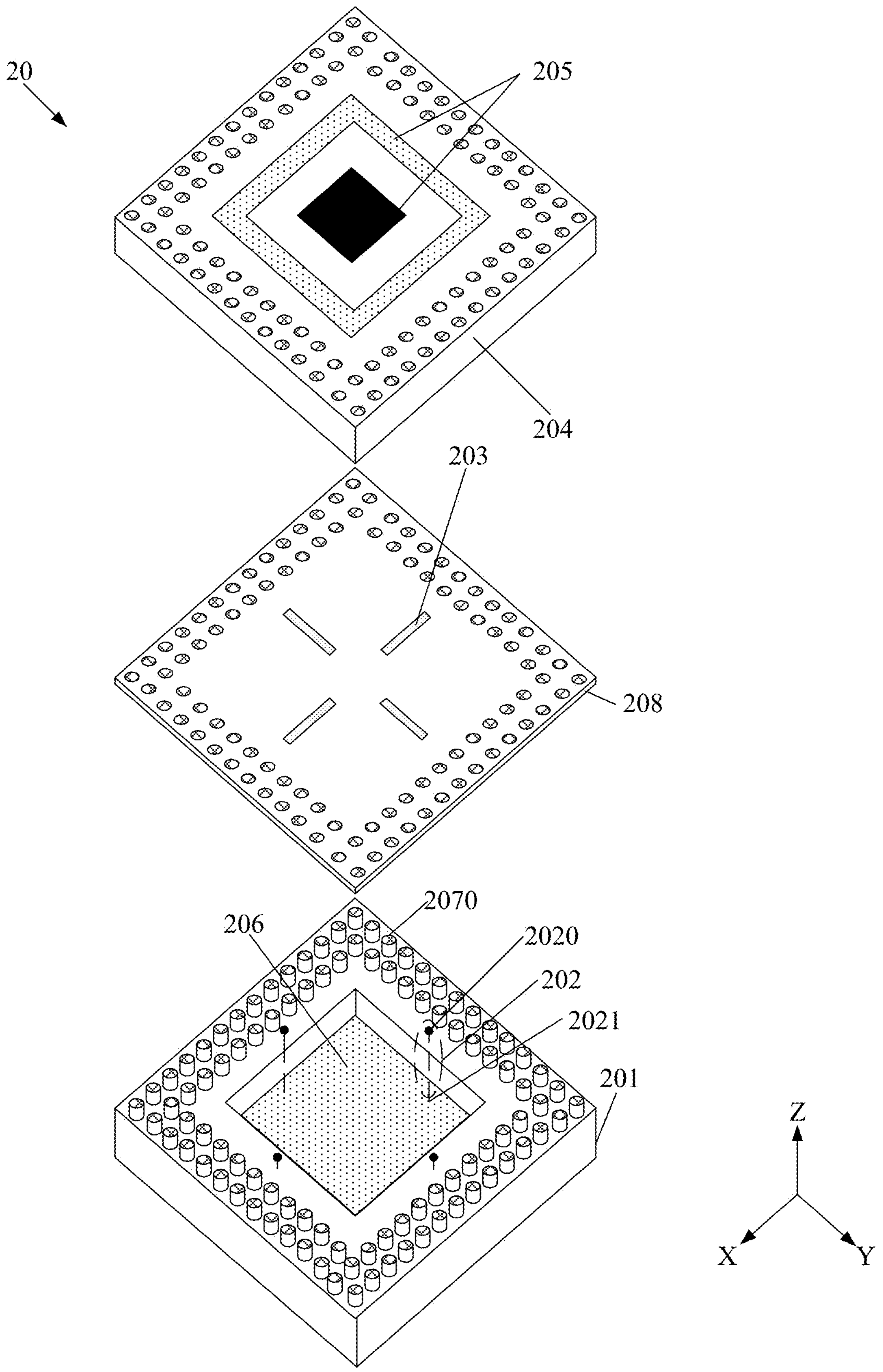
FIG. 7 is an exploded view 4 of an antenna unit according to an embodiment of the present disclosure.

For example, with reference to FIG. 3, as shown in FIG. 7, the antenna unit 20 may further include a second insulator 208 disposed between the first radiator 206 and the first insulator 204. The M couplers 203 are carried on the second insulator 208.

It should be noted that a circular filling part on the second insulator 208 in FIG. 7 is used to indicate that the first metal post 2070 penetrates through the second insulator 208 and is embedded in the first insulator 204.

Optionally, in this embodiment of the present disclosure, a shape of the second insulator may be the same as the opening shape of the insulating groove, for example, any possible shape such as a square or a cylinder.

Optionally, in this embodiment of the present disclosure, a material of the second insulator may be an insulating material with a relatively small relative dielectric constant and a relatively small loss angle tangent value.

Optionally, in this embodiment of the present disclosure, the material of the second insulator may be the same as the material of the first insulator.

Optionally, in this embodiment of the present disclosure, the material of the second insulator may be any possible material such as plastic or foam. This may be determined based on an actual use requirement, and is not limited in the embodiments of the present disclosure.

For example, in this embodiment of the present disclosure, a relative dielectric constant of the material of the second insulator may be 2.5, and a loss angle tangent value may be 0.001.

Certainly, in actual implementation, the shape of the second insulator may be any shape that can meet an actual use requirement. This is not limited in this embodiment of the present disclosure, and may be determined based on actual use requirement.

It should be noted that in this embodiment of the present disclosure, on the premise that the M couplers are carried, if a relative dielectric constant and a loss angle tangent value of the material of the second insulator are smaller, the second insulator has less impact on the radiation effect of the antenna unit. That is, if the relative dielectric constant and the loss angle tangent value of the material of the second insulator are smaller, the second insulator has less impact on operating performance of the antenna unit and the radiation effect of the antenna unit is better.

Optionally, in this embodiment of the present disclosure, at least one of the at least two radiators may be located on a surface of the first insulator.

It can be understood that, in this embodiment of the present disclosure, both the at least two radiators may be located on the surface of the first insulator; or some of the at least two radiators may be located on the surface of the first insulator, or one of the at least two radiators may be located on the surface of the first insulator. This may be determined based on an actual use requirement.

For example, it is assumed that the at least two radiators are two radiators, and are respectively a second radiator and a third radiator. As shown in FIG. 4, both a second radiator 2050 and a third radiator 2051 may be located on the surface of the first insulator.

It should be noted that, as shown in FIG. 4, the second radiator 2050 and the third radiator 2051 are carried on the first insulator 204, the M couplers are carried on the second insulator 208, and the second insulator 208 is located between the first insulator 204 and the first radiator (not shown in FIG. 4). The feeding part 202 is disposed on an opening edge of the insulating groove 201 and penetrates through the insulating groove 201, and the feeding part 202 is electrically connected to the coupler 203 through the second insulator 208.

Certainly, in actual implementation, the at least two radiators may also be disposed in any possible location in the first insulator. This may be determined based on an actual use requirement, and is not limited in this embodiment of the present disclosure.

In this embodiment of the present disclosure, because locations of radiators are different, and performance of the antenna unit may also be different, locations of the at least two radiators may be set based on an actual use requirement, so that design of the antenna unit can be more flexible.

Figure 8:
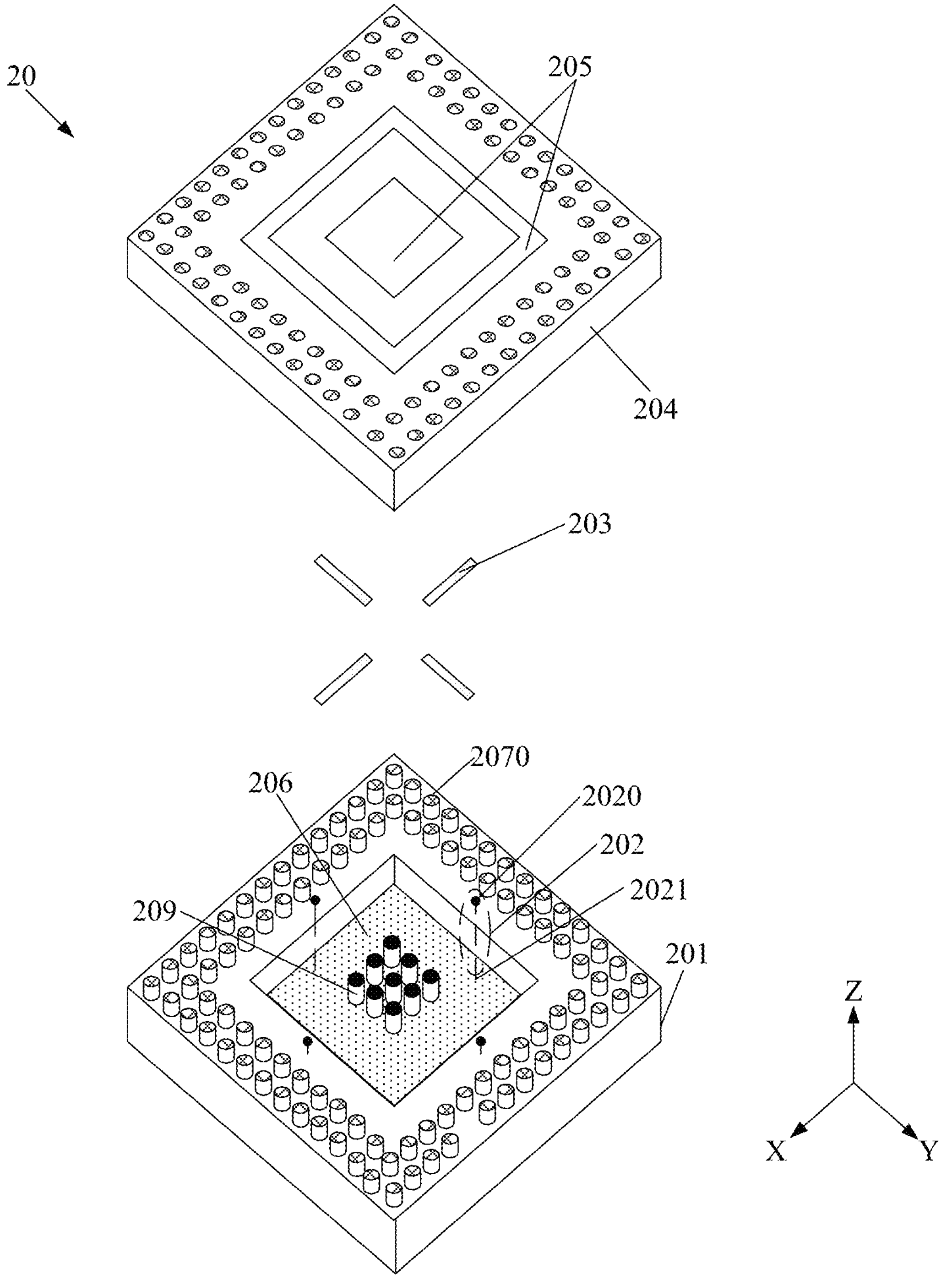
FIG. 8 is an exploded view 5 of an antenna unit according to an embodiment of the present disclosure.

Optionally, in this embodiment of the present disclosure, with reference to FIG. 3, as shown in FIG. 8, the antenna unit 20 may further include K third metal posts 209, and the K third metal posts 209 may protrude from an inner surface of the bottom of the insulating groove 201.

A length of each of the K third metal posts 209 may be less than or equal to a depth of the insulating groove, and K is a positive integer.

It can be understood that, in this embodiment of the present disclosure, the K third metal posts are disposed at the bottom of the insulating groove.

For example, as shown in FIG. 4, the third metal post 209 is disposed at the bottom of the insulating groove 201, and the third metal post 209 protrudes from the inner surface of the insulating groove 201.

In this embodiment of the present disclosure, a length of the third metal post may be less than a height of the insulating groove.

Optionally, in this embodiment of the present disclosure, a diameter of the third metal post may be determined based on a size of the insulating groove. The diameter of the third metal post may be determined based on an area of the inner surface of the bottom of the insulating groove.

Optionally, in this embodiment of the present disclosure, the K third metal posts may be evenly distributed at the bottom of the groove. The K third metal posts may be evenly distributed in a central location at the bottom of the insulating groove.

In this embodiment of the present disclosure, the antenna unit may further include the K third metal posts, and the K third metal posts may be configured to adjust an impedance of the antenna unit, to adjust the first frequency. The first frequency may be a frequency of an electromagnetic wave generated by coupling the M couplers with the at least two radiators and the first radiator.

Optionally, in this embodiment of the present disclosure, the K third metal posts may be arranged in a form of an array. The K third metal posts may be arranged in a central location at the bottom of the insulating groove in a form of an array.

For example, as shown in FIG. 8, nine third metal posts (that is, K=9) are disposed at the bottom of the insulating groove 201, and the nine third metal posts are arranged in the central position at the bottom of the insulating groove 201 in a form of a 3×3 array (that is, a square matrix).

Optionally, in this embodiment of the present disclosure, the antenna unit may further include a third insulator disposed in the insulating groove, and the third insulator may surround the third metal post.

A difference between a relative dielectric constant of the third metal post and a relative dielectric constant of air may be in a preset range.

In this embodiment of the present disclosure, because the third metal post is disposed at the bottom of the insulating groove, the third insulator may be disposed in the insulating groove to isolate the third metal post from the foregoing isolator (for example, the first metal post and the second metal post), thereby avoiding mutual interference between the third metal post and the isolator.

Optionally, in this embodiment of the present disclosure, the third insulator may be a foam material or a plastic material whose relative dielectric constant is 1 or close to 1 (that is, the relative dielectric constant of air). This may be determined based on an actual use requirement, and is not limited in the embodiments of the present disclosure.

In this embodiment of the present disclosure, the preset range may be determined based on antenna performance, and is not limited in this embodiment of the present disclosure.

Optionally, in this embodiment of the present disclosure, no insulator may be filled in the insulating groove. It can be understood that, in a case that no insulator is filled in the insulating groove, a medium filled in the insulating groove is air (the relative dielectric constant is $1C^2$).

In this embodiment of the present disclosure, the third insulator may isolate the third metal post and the isolator, so that the two do not interfere with each other, thereby ensuring more stable performance of the antenna unit.

Figure 9:
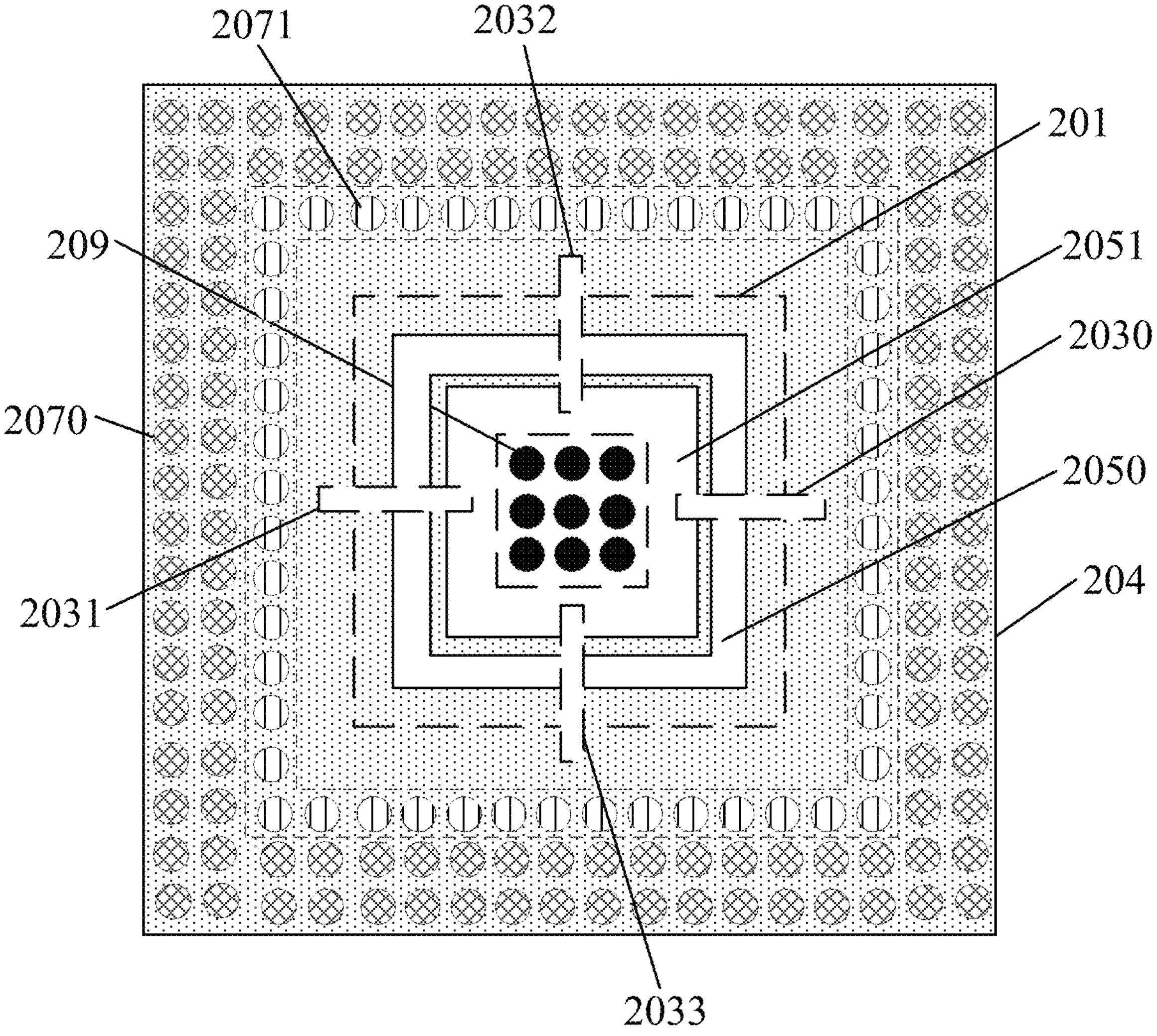
FIG. 9 is a top view of an antenna unit according to an embodiment of the present disclosure.

The following further describes the antenna unit provided in this embodiment of the present disclosure with reference to FIG. 9.

For example, as shown in FIG. 9, FIG. 9 is a top view of the antenna unit provided in this embodiment of the present disclosure in a Z-axis reverse direction (a coordinate system shown in FIG. 3). The second radiator 2050 and the third radiator 2051 are disposed in the first insulator 204, and four couplers (including a coupler 2030, a coupler 2031, a coupler 2032, and a coupler 2033) are further disposed between the first insulator 204 and the insulating groove 201 (only the opening of the insulating groove is shown in FIG. 9). The N first metal posts 2070 (the N first metal posts are embedded in the first insulator 204) and the P second metal posts 2071 are respectively disposed on the opening edge of the insulating groove 201, and the K third metal posts 209 are disposed at the bottom of the insulating groove. Because the four couplers overlap the second radiator 2050 and the third radiator 2051 in the Z-axis direction, the four couplers may be coupled to the second radiator 2050 and the third radiator 2051. Because the four couplers do not overlap the K third metal posts 209 in the Z-axis direction, coupling between the K third metal posts 209 and the four couplers can be avoided, so that the K third metal posts 209 can adjust an impedance of the antenna unit, thereby adjusting a frequency range covered by the antenna unit.

It should be noted that, when the antenna unit provided in this embodiment is overlooked in the Z-axis direction, the insulating groove, the coupler, the P second metal posts, and the K third metal posts are all invisible. Therefore, to indicate a relationship between the components, the insulating groove and the couplers (including the coupler 2030, the coupler 2031, the coupler 2032, and the coupler 2033) in FIG. 9 are shown by dashed lines. The P second metal posts are show by filling vertical lines and being surrounded by dotted lines. The K third metal posts are shown by filling in black and being surrounded by dotted lines.

In this embodiment of the present disclosure, because a frequency of the electromagnetic wave generated by coupling the at least two radiators and the first radiator with the M couplers is related to the impedance of the antenna unit, the impedance of the antenna unit may be adjusted by disposing the third metal post. In this way, the frequency of the electromagnetic wave generated by coupling the at least two radiators and the first radiator with the M couplers can be adjusted, so that a frequency band covered by the antenna unit can be in a 5G millimeter-wave frequency band.

It should be noted that, in this embodiment of the present disclosure, the antenna unit shown in the foregoing accompanying drawings is described by using an example with reference to one of the accompanying drawings in this embodiment of the present disclosure. In specific implementation, the antenna unit shown in the foregoing accompanying drawings may be further implemented with reference to any other accompanying drawings that may be combined shown in the foregoing embodiments. Details are not described herein again.

An embodiment of the present disclosure provides a terminal device, and the terminal device may include the antenna unit provided in any one of the foregoing embodiments shown in FIG. 2 to FIG. 9. For specific descriptions of the antenna unit, refer to the related descriptions of the antenna unit in the foregoing embodiment. Details are not described herein again.

The terminal device in this embodiment of the present disclosure may be a mobile terminal, or may be a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile terminal may be a personal computer (PC), a television (TV), or the like. This is not limited in this embodiment of the present disclosure.

Optionally, in this embodiment of the present disclosure, at least one first groove may be disposed in a housing of the terminal device, and each antenna unit may be disposed in one first groove.

In this embodiment of the present disclosure, the foregoing first groove may be disposed in the housing of the terminal device, and the antenna unit provided in this embodiment of the present disclosure is disposed in the first groove, so that at least one antenna unit provided in this embodiment of the present disclosure is integrated into the terminal device.

Optionally, in this embodiment of the present disclosure, the foregoing first groove may be disposed in a bezel of the housing of the terminal device.

Figure 10:
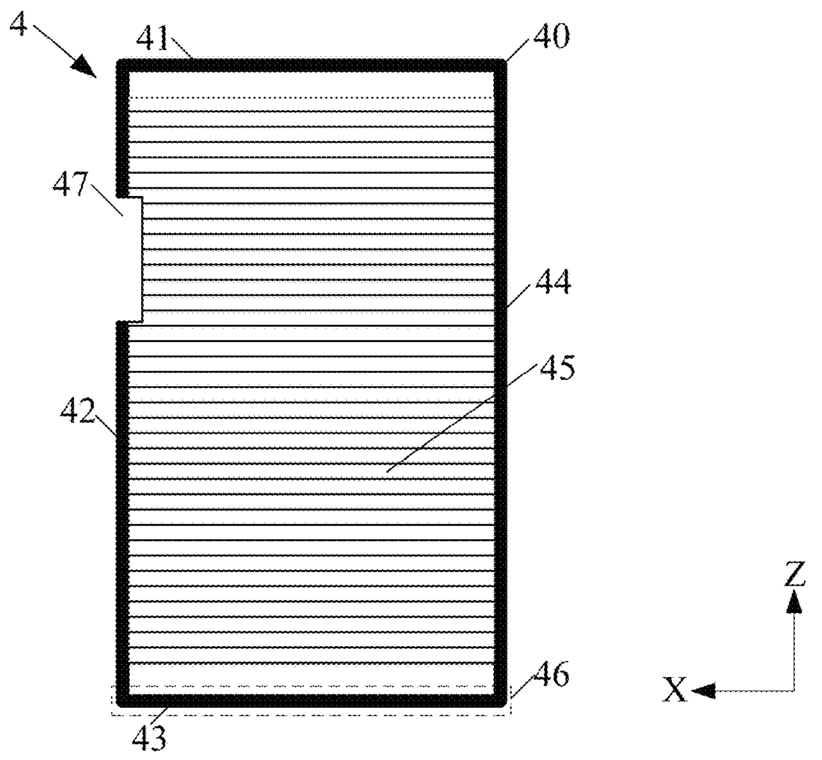
FIG. 10 is a schematic diagram of a hardware structure of a terminal device according to an embodiment of the present disclosure.

In this embodiment of the present disclosure, as shown in FIG. 10, a terminal device 4 may include a housing 40. The housing 40 may include a first bezel 41, a second bezel 42 connected to the first bezel 41, a third bezel 43 connected to the second bezel 42, and a fourth bezel 44 connected to both the third bezel 43 and the first bezel 41. The terminal device 4 may further include a floor 45 that is connected to both the second bezel 42 and the fourth bezel 44, and a first antenna 46 that includes the third bezel 43, a part of the second bezel 42, and a part of the fourth bezel 44. A first groove 47 is disposed on the second bezel 42. In this way, the antenna unit provided in this embodiment of the present disclosure may be disposed in the first groove, so that the terminal device can include an array antenna module formed by the antenna unit provided in this embodiment of the present disclosure, and further a design of the antenna unit provided in this embodiment of the present invention can be implemented in the terminal device.

The floor may be a PCB or a metal middle bezel in the terminal device, or may be any part that may be used as a virtual ground such as a display screen of the terminal device.

It should be noted that, in this embodiment of the present disclosure, the foregoing first antenna may be a communications antenna of a system such as a second generation mobile communications system (that is, a 2G system), a third generation mobile communications system (that is, a 3G system), or a fourth generation mobile communications system (that is, a 4G system) of the terminal device. The antenna unit provided in this embodiment of the present disclosure may be an antenna of a 5G system of the terminal device.

Optionally, in this embodiment of the present disclosure, the first bezel, the second bezel, the third bezel, and the fourth bezel may be sequentially head-to-tail connected to form a closed bezel. Alternatively, a part of the first bezel, the second bezel, the third bezel, and the fourth bezel may be connected to form a semi-closed bezel. Alternatively, the first bezel, the second bezel, the third bezel, and the fourth bezel may not be connected to each other to form an open bezel. This may be determined based on an actual use requirement, and is not limited in the embodiments of the present disclosure.

It should be noted that bezels included in the housing 40 shown in FIG. 10 are described by using an example in which the first bezel 41, the second bezel 42, the third bezel 43, and the fourth bezel 44 are sequentially head-to-tail connected to form a closed bezel. This is not construed as any limitation on this embodiment of the present invention. For a bezel formed between the first bezel, the second bezel, the third bezel, and the fourth bezel in another connection manner (some bezels are connected or the bezels are not connected to each other), an implementation manner thereof is similar to the implementation manner provided in this embodiment of this disclosure. To avoid repetition, details are not described herein again.

Optionally, in this embodiment of the present disclosure, the at least one first groove may be disposed in a same bezel of the housing, or may be disposed in different bezels. This may be determined based on an actual use requirement, and is not limited in the embodiments of the present disclosure.

Optionally, in this embodiment of the present disclosure, one first groove may be disposed in the first bezel, the second bezel, the third bezel, or the fourth bezel of the housing. This may be determined based on an actual use requirement, and is not limited in the embodiments of the present disclosure.

It should be noted that in this embodiment of the present disclosure, FIG. 10 is described by using an example in which the first groove 47 is disposed on the second bezel 42 of the housing 40, and an opening direction of the first groove 47 is a Z-axis forward direction of a coordinate system shown in FIG. 10.

It can be understood that, in this embodiment of the present disclosure, as shown in FIG. 10, when the first groove is disposed on the first bezel 41 of the housing, the opening direction of the first groove may be an X-axis forward direction. When the first groove is disposed on the third bezel of the housing, the opening direction of the first groove may be an X-axis reverse direction. When the first groove is disposed on the fourth bezel of the housing, the opening direction of the first groove may be a Z-axis reverse direction.

Optionally, in this embodiment of the present disclosure, a plurality of first grooves may be disposed in the housing of the terminal device, and one antenna unit provided in this embodiment of the present disclosure may be disposed in each first groove. In this way, the plurality of antenna units may form an antenna array in the terminal device, so that antenna performance of the terminal device can be improved.

Figure 11:
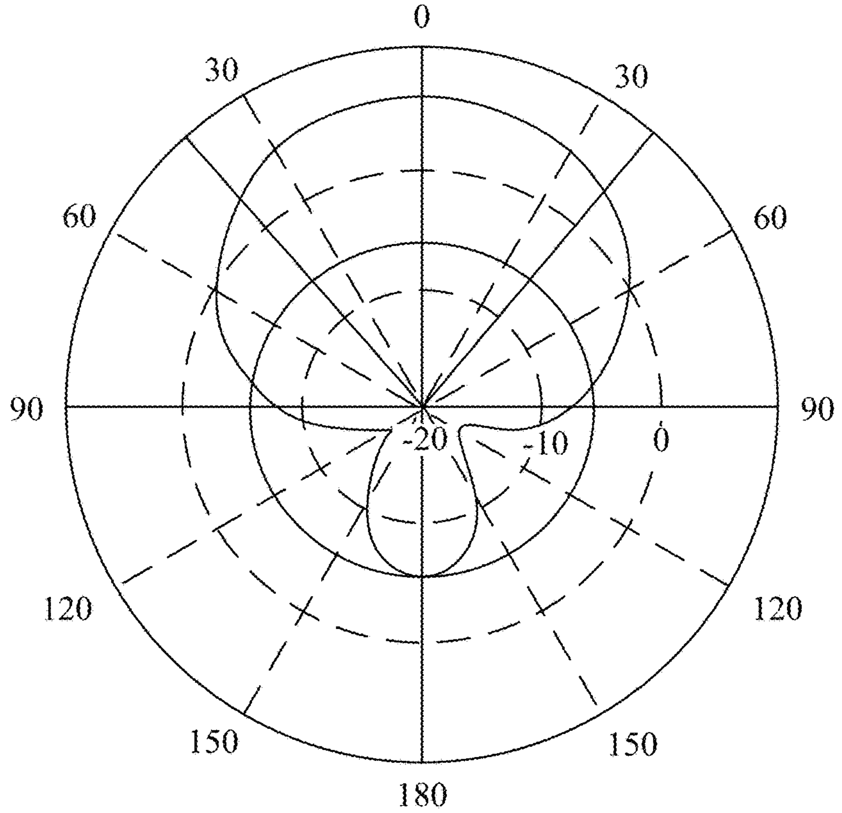
FIG. 11 is a radiation direction diagram 1 of an antenna unit according to an embodiment of the present disclosure.
Figure 12:
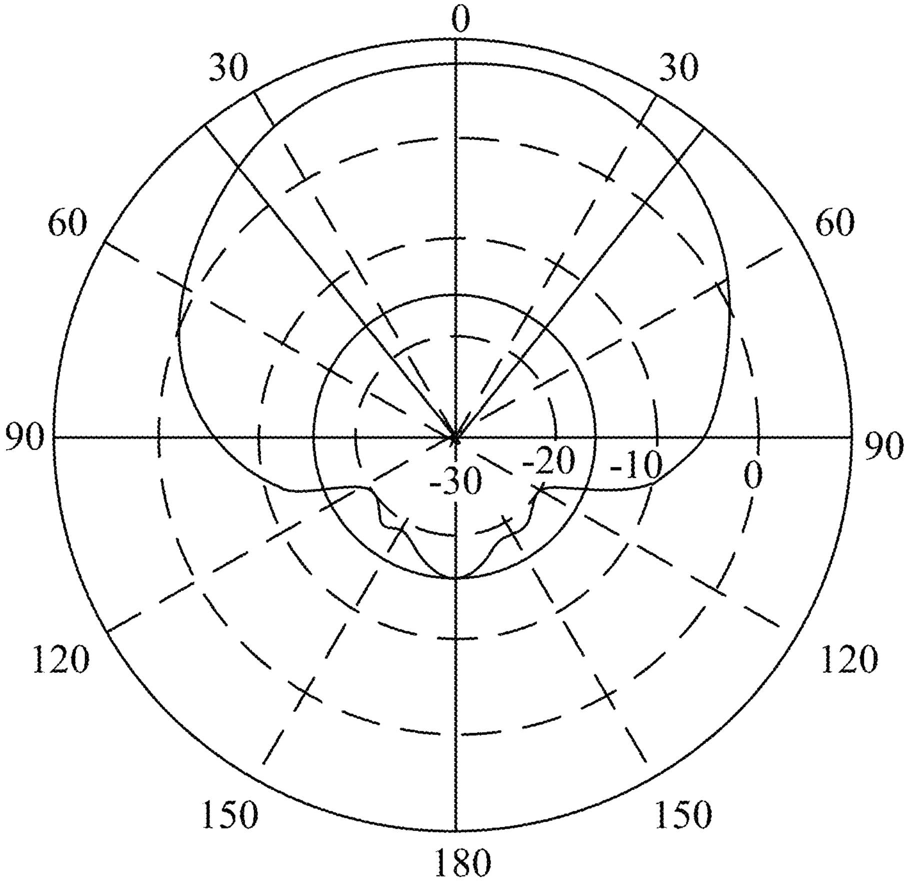
FIG. 12 is a radiation direction diagram 2 of an antenna unit according to an embodiment of the present disclosure.

In this embodiment of the present disclosure, as shown in FIG. 11, FIG. 11 is a radiation direction diagram of the antenna unit when the antenna unit provided in this embodiment of the present disclosure radiates a signal (that is, the antenna unit radiates a low-frequency signal) with a frequency of 28 GHz. As shown in FIG. 12, FIG. 12 is a radiation direction diagram of the antenna unit when the antenna unit provided in this embodiment of the present disclosure radiates a signal with a frequency of 39 GHz (that is, the antenna unit radiates a high-frequency signal). It can be learned from FIG. 11 and FIG. 12 that a maximum radiation direction when the high-frequency signal is radiated is the same as a maximum radiation direction when the low-frequency signal is radiated. Therefore, the antenna unit provided in this embodiment of the present disclosure is suitable for forming an antenna array. In this way, at least two first grooves may be disposed in the terminal device, and one antenna unit provided in this embodiment of this disclosure is disposed in each first groove, so that the terminal device can include the antenna array, thereby improving antenna performance of the terminal device.

Optionally, in this embodiment of the present disclosure, in a case that a plurality of antenna units provided in this embodiment are integrated into the terminal device, a distance between the antenna units may be determined based on an isolation degree of the antenna unit and a scanning angle of an antenna array formed by the plurality of antenna units. This may be determined based on an actual use requirement, and is not limited in the embodiments of the present disclosure.

Optionally, in this embodiment of the present disclosure, a quantity of the first grooves disposed on the housing of the terminal device may be determined based on a size of the first groove and a size of the housing of the terminal device. This is not limited in this embodiment of the present disclosure.

Figure 13:
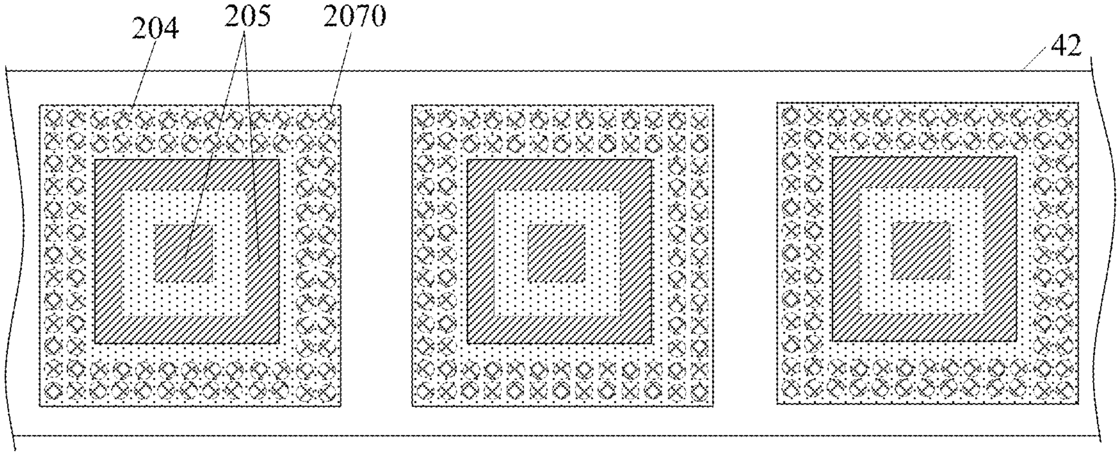
FIG. 13 is a left side view of a terminal device according to an embodiment of the present disclosure.

For example, it is assumed that a plurality of first grooves (not shown in FIG. 13) are disposed on the second bezel of the housing, and one antenna unit is disposed in each first groove. As shown in FIG. 13, the first metal post 2070 is disposed on an opening edge of the insulating groove and is embedded in the first insulator 204, and the at least two radiators 205 are located on a surface of the first insulator 204.

It should be noted that, in this embodiment of the present disclosure, three first grooves (three antenna units are disposed) disposed on the second bezel in FIG. 13 are used as an example for description, and is not construed as any limitation on this embodiment of the present disclosure. It can be understood that, in specific implementation, a quantity of first grooves disposed on the second bezel may be determined based on an actual use requirement, and is not limited in this embodiment of the present disclosure.

An embodiment of the present disclosure provides a terminal device, and the terminal device includes an antenna unit. The antenna unit may include an insulating groove, M feeding parts disposed in the insulating groove, M couplers, a first insulator, at least two radiators carried on the first insulator, a first radiator disposed at a bottom of the insulating groove, and an isolator disposed around the M couplers, where the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer. According to this solution, in one aspect, because the coupler is coupled to the at least two radiators and the first radiator, in a case that the coupler receives an alternating current signal, the coupler may be coupled to the at least two radiators and the first radiator, so that the at least two radiators and the first radiator can generate an induced alternating current signal, and the at least two radiators and the first radiator can generate electromagnetic waves of a specific frequency. In addition, because resonance frequencies of different radiators are different, frequencies of electromagnetic waves generated by the at least two radiators and the first radiator are also different, so that the antenna unit can cover different frequency bands, that is, frequency bands covered by the antenna unit can be increased. On the other hand, the isolator is disposed around the M couplers in the antenna unit. Therefore, the isolator may isolate electromagnetic waves radiated by the at least two radiators and the first radiator in a direction of the isolator, so that a maximum radiation direction of the electromagnetic waves generated by the at least two radiators and the first radiator faces an opening direction of the insulating groove. Thus, radiation intensity of the antenna unit in a radiation direction of the antenna unit can be improved while directionality of the antenna unit is ensured. In this way, frequency bands covered by the antenna unit can be increased, and radiation intensity of the antenna unit in the radiation direction of the antenna unit can be improved. Therefore, performance of the antenna unit can be improved.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or device that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal device (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An antenna unit, wherein the antenna unit comprises an insulating groove, M feeding parts disposed in the insulating groove, M couplers, a first insulator, at least two radiators carried on the first insulator, a first radiator disposed at a bottom of the insulating groove, and an isolator disposed around the M couplers, wherein the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer;

wherein the antenna unit further comprises K third metal posts, the K third metal posts protrude from an inner surface of the bottom of the insulating groove, a length of each third metal post is less than or equal to a depth of the insulating groove, and K is a positive integer;

wherein orthographic projections of the K third metal posts onto a plane where the bottom of the insulation groove is located at least partially overlaps with an orthographic projection of the first radiator on the plane where the bottom of the insulation groove is located.

2. The antenna unit according to claim 1, wherein the isolator comprises N first metal posts, and N is a positive integer.

3. The antenna unit according to claim 2, wherein the isolator further comprises P second metal posts, and the P second metal posts are disposed inside the N first metal posts, wherein a length of the second metal post is less than a length of the first metal post, and P is a positive integer.

4. The antenna unit according to claim 1, wherein the M couplers are four couplers, the four couplers form two coupler groups, each coupler group comprises two symmetrically disposed couplers, and a symmetry axis of one coupler group is orthogonal to a symmetry axis of the other coupler group, wherein an amplitude of a signal source connected to a first feeding part is equal to an amplitude of a signal source connected to a second feeding part, a phase difference is 180 degrees, and the first feeding part and the second feeding part are feeding parts electrically connected to two couplers in a same coupler group.

5. The antenna unit according to claim 4, wherein the two couplers are located on a same plane, and a coupler in any one coupler group is distributed on a symmetry axis of the other coupler group.

6. The antenna unit according to claim 1, wherein the at least two radiators comprise a second radiator and a third radiator.

7. The antenna unit according to claim 6, wherein the second radiator is a ring radiator, and the third radiator is a polygon radiator.

8. The antenna unit according to claim 6, wherein a resonance frequency of the first radiator is a first frequency, a resonance frequency of the second radiator is a second frequency, and a resonance frequency of the third radiator is a third frequency, wherein the first frequency is less than the second frequency, and the second frequency is less than the third frequency.

9. The antenna unit according to claim 8, wherein the first frequency is in a first frequency range, the second frequency is in a second frequency range, and the third frequency is in a third frequency range, wherein the first frequency range is 24 GHZ-27 GHz, the second frequency range is 27 GHz-30 GHZ, and the third frequency range is 37 GHz-43 GHz.

10. The antenna unit according to claim 1, wherein the antenna unit further comprises a second insulator disposed between the first radiator and the first insulator, and the M couplers are carried on the second insulator.

11. The antenna unit according to claim 1, wherein at least one of the at least two radiators is located on a surface of the first insulator.

12. The antenna unit according to claim 11, wherein the antenna unit further comprises a third insulator disposed in the insulating groove, and the third insulator surrounds the K third metal posts, wherein a difference between a relative dielectric constant of the third insulator and a relative dielectric constant of air is in a preset range.

13. A terminal device, wherein the terminal device comprises an antenna unit, the antenna unit comprises an insulating groove, M feeding parts disposed in the insulating groove, M couplers, a first insulator, at least two radiators carried on the first insulator, a first radiator disposed at a bottom of the insulating groove, and an isolator disposed around the M couplers, wherein the M feeding parts are insulated from the first radiator and the isolator, the M couplers are located between the first radiator and the first insulator, each of the M feeding parts is electrically connected to one coupler, each of the M couplers is coupled to the at least two radiators and the first radiator, resonance frequencies of different radiators are different, and M is a positive integer;

wherein the antenna unit further comprises K third metal posts, the K third metal posts protrude from an inner surface of the bottom of the insulating groove, a length of each third metal post is less than or equal to a depth of the insulating groove, and K is a positive integer;

wherein orthographic projections of the K third metal posts onto a plane where the bottom of the insulation groove is located at least partially overlaps with an orthographic projection of the first radiator on the plane where the bottom of the insulation groove is located.

14. The terminal device according to claim 13, wherein at least one first groove is disposed in a housing of the terminal device, and each antenna unit is disposed in one first groove.

15. The terminal device according to claim 13, wherein the isolator comprises N first metal posts, and N is a positive integer.

16. The terminal device according to claim 15, wherein the isolator further comprises P second metal posts, and the P second metal posts are disposed inside the N first metal posts, wherein a length of the second metal post is less than a length of the first metal post, and P is a positive integer.

17. The terminal device according to claim 13, wherein the M couplers are four couplers, the four couplers form two coupler groups, each coupler group comprises two symmetrically disposed couplers, and a symmetry axis of one coupler group is orthogonal to a symmetry axis of the other coupler group, wherein an amplitude of a signal source connected to a first feeding part is equal to an amplitude of a signal source connected to a second feeding part, a phase difference is 180 degrees, and the first feeding part and the second feeding part are feeding parts electrically connected to two couplers in a same coupler group.

18. The terminal device according to claim 17, wherein the two couplers are located on a same plane, and a coupler in any one coupler group is distributed on a symmetry axis of the other coupler group.

19. The terminal device according to claim 13, wherein the at least two radiators comprise a second radiator and a third radiator.

20. The terminal device according to claim 13, wherein the antenna unit further comprises a third insulator disposed in the insulating groove, and the third insulator surrounds the K third metal posts, wherein a difference between a relative dielectric constant of the third insulator and a relative dielectric constant of air is in a preset range.

* * * * *